(12) United States Patent
Horita (10) Patent No.: US 11,528,411 B2
(45) Date of Patent: Dec. 13, 2022

(54) IMAGING PLAN PRESENTATION APPARATUS AND METHOD FOR UPDATING AND RE-GENERATING AN IMAGING PLAN

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/115,188

(22) Filed: Dec. 8, 2020

(65) Prior Publication Data

US 2021/0092288 A1    Mar. 25, 2021

Related U.S. Application Data

(63) Continuation of application No. PCT/JP2019/025340, filed on Jun. 26, 2019.

(30) Foreign Application Priority Data

Jul. 3, 2018  (JP) .............................. JP2018-126941

(51) Int. Cl.
*H04N 5/232*    (2006.01)

(52) U.S. Cl.
CPC ..... *H04N 5/23222* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 7,418,320 B1 * | 8/2008 | Bodin | G05D 1/0094 |
| | | | 701/411 |
| 2007/0129626 A1 * | 6/2007 | Mahesh | A61B 34/20 |
| | | | 600/407 |

(Continued)

FOREIGN PATENT DOCUMENTS

| | | |
|---|---|---|
| CN | 101815171 A | 8/2010 |
| EP | 3 410 689 A1 | 12/2018 |

(Continued)

OTHER PUBLICATIONS

International Search Report issued in PCT/JP2019/025340; dated Sep. 17, 2019.

(Continued)

*Primary Examiner* — Edemio Navas, Jr.
(74) *Attorney, Agent, or Firm* — Studebaker & Brackett PC (57) ABSTRACT

Provided are an imaging plan presentation apparatus and method capable of presenting an imaging plan to a user in accordance with conditions of images necessary for checking and an imaging range in a captured image. After an imaging unit (14) completes imaging, an imaging plan update unit (15) determines whether an uncaptured area has been identified by an uncaptured-area identification unit (151). If Yes is obtained, the imaging plan update unit (15) updates the imaging plan on the basis of the uncaptured imaging range, and re-generates an imaging plan corresponding to the uncaptured imaging range. Then, an imaging plan presentation unit (13) presents an imaging range to be captured next to a user on the basis of the re-generated imaging plan.

18 Claims, 6 Drawing Sheets

(56) References Cited

U.S. PATENT DOCUMENTS

| | | | |
|---|---|---|---|
| 2015/0015730 A1 | 1/2015 | Choi et al. | |
| 2018/0322624 A1* | 11/2018 | Nonaka | G06T 7/0002 |
| 2020/0195847 A1* | 6/2020 | Zheng | G06K 9/6201 |
| 2020/0368616 A1* | 11/2020 | Delamont | A63F 13/25 |

FOREIGN PATENT DOCUMENTS

| | | |
|---|---|---|
| JP | 2010-204773 A | 9/2010 |
| JP | 2017-071972 A | 4/2017 |
| JP | 6120037 B1 | 4/2017 |
| JP | 2018-152737 A | 9/2018 |
| KR | 10-2014-0030444 A | 3/2014 |
| WO | 2017/130700 A1 | 8/2017 |
| WO | 2017/155005 A1 | 9/2017 |

OTHER PUBLICATIONS

International Preliminary Report On Patentability issued in PCT/JP2019/025340; completed Jun. 8, 2020.

The extended European search report issued by the European Patent Office dated Jul. 23, 2021, which corresponds to European Patent Application No. 19830411.5-1209 and is related to U.S. Appl. No. 17/115,188.

An Office Action mailed by China National Intellectual Property Administration dated Sep. 23, 2021, which corresponds to Chinese Application No. 201980042874.4 and is related to U.S. Appl. No. 17/115,188; with English language translation.

\* cited by examiner

IMAGING PLAN PRESENTATION APPARATUS AND METHOD FOR UPDATING AND RE-GENERATING AN IMAGING PLAN

CROSS-REFERENCE TO RELATED APPLICATIONS

The present application is a Continuation of PCT International Application No. PCT/JP2019/025340 filed on Jun. 26, 2019 claiming priority under 35 U.S.C. § 119(a) to Japanese Patent Application No. 2018-126941 filed on Jul. 3, 2018. Each of the above applications is hereby expressly incorporated by reference, in its entirety, into the present application.

BACKGROUND OF THE INVENTION

1. Field of the Invention

The present invention relates to imaging plan presentation apparatuses and methods, and more specifically to an imaging plan presentation apparatus and method for presenting an imaging plan to a user.

2. Description of the Related Art

Conventionally, there is a technique for capturing an image to check a structure such as a bridge, a road, a dam, or a building and detecting damage to the structure from the image.

JP6120037B discloses that when a combined image for checking is to be created, the overlap rate between adjacent images is determined, and the necessity of re-imaging on the basis of the overlap rate is determined.

JP2017-71972A discloses that a first check plan is created on the basis of deterioration estimation, an inspection is performed in accordance with the first check plan, and then a more detailed second check plan is carried out on the basis of the results of check items in the first check plan.

SUMMARY OF THE INVENTION

To detect damage to a structure from an image, about a certain degree of resolution is required. It is thus necessary to divide a photographic subject, which is the structure, into portions and to photograph the portions. When manually photographing a long and large structure portion by portion, a user may not identify which portion the user is currently photographing or the extent to which the structure has been photographed. For example, when the deck surface of a bridge is being photographed portion by portion, it may be difficult to identify which portion has been photographed since the deck surface has a few features and has repetition of similar patterns.

In addition, when it is difficult to identify whether the captured images of these divided portions secure an area necessary for the detection of damage to the structure, a large number of images more than necessary may be captured and a burden on the user may increase.

In JP6120037B and JP2017-71972A, it is not presented to the user which portion to photograph from the captured images.

The present invention has been made in view of the foregoing problems, and an object thereof is to provide an imaging plan presentation apparatus and method capable of presenting an imaging plan to a user in accordance with conditions of images necessary for checking and an imaging range in a captured image.

An imaging plan presentation apparatus according to a first aspect of the present invention includes an imaging condition acquisition unit that acquires an imaging condition necessary for detection of damage to a structure, an imaging plan generation unit that generates an imaging plan for an entire check point for the structure on the basis of the imaging condition acquired by the imaging condition acquisition unit, and an imaging plan presentation unit that presents the imaging plan to a user. The imaging plan generation unit re-generates an imaging plan corresponding to an uncaptured area of the check point for the structure on the basis of an actual imaging result of the check point for the structure.

In an imaging plan presentation apparatus according to a second aspect of the present invention, the imaging plan presentation unit generates an imaging plan such that the number of times imaging is to be performed to cover the entire check point for the structure is minimum.

In an imaging plan presentation apparatus according to a third aspect of the present invention, the imaging plan presentation unit generates an imaging plan such that a moving distance of an imaging device to perform imaging to cover the entire check point for the structure is shortest.

In an imaging plan presentation apparatus according to a fourth aspect of the present invention, the imaging condition includes a size of the structure, the number of pixels of a captured image, a resolution, and an overlap rate between different images.

In an imaging plan presentation apparatus according to a fifth aspect of the present invention, the imaging plan is an imaging range corresponding to sub-areas obtained by dividing a surface of the check point for the structure into a plurality of areas, and the imaging plan generation unit calculates an actual imaging size of each captured image from the resolution and the number of pixels, and generates, as an imaging plan, an imaging range that covers the surface of the check point for the structure at the overlap rate or greater.

In an imaging plan presentation apparatus according to a sixth aspect of the present invention, the imaging plan includes an imaging order of the sub-areas, and the imaging plan generation unit generates an imaging plan such that a moving distance of an imaging device to perform imaging in the imaging order is shortest.

In an imaging plan presentation apparatus according to a seventh aspect of the present invention, the imaging plan presentation unit presents the imaging range in such a manner that the imaging range is superimposed on a drawing of the structure.

In an imaging plan presentation apparatus according to an eighth aspect of the present invention, the imaging plan presentation unit presents the imaging range in such a manner that the imaging range is superimposed on a drawing of the structure displayed on a display.

In an imaging plan presentation apparatus according to a ninth aspect of the present invention, the imaging plan presentation unit presents the imaging range in such a manner that the imaging range is superimposed on the check point for the structure by using a projector.

In an imaging plan presentation apparatus according to a tenth aspect of the present invention, the imaging plan presentation unit presents the imaging range in such a manner that the imaging range is superimposed on a captured image of the check point for the structure by using an augmented reality device.

In an imaging plan presentation apparatus according to an eleventh aspect of the present invention, the imaging plan presentation unit includes a user guidance unit that guides the user to an imaging position on the basis of position information of an imaging device or distance measurement information from the imaging device to the structure.

An imaging plan presentation apparatus according to a twelfth aspect of the present invention further includes an actual size acquisition unit that acquires an actual size of the check point for the structure, and a panoramic image creation unit that combines a plurality of captured images of the check point for the structure to create a panoramic image. The imaging plan generation unit identifies an uncaptured area on the basis of the actual size of the check point for the structure acquired by the actual size acquisition unit and the panoramic image created by the panoramic image creation unit, and re-generates an imaging plan corresponding to the identified uncaptured area.

An imaging plan presentation apparatus according to a thirteenth aspect of the present invention further includes a full-view image acquisition unit that acquires a full-view image of the check point for the structure, and a sub-image acquisition unit that acquires a plurality of sub-images, each being a captured image of a portion of the check point for the structure. The imaging plan generation unit checks the plurality of sub-images against the full-view image to identify an uncaptured area, and re-generates an imaging plan corresponding to the identified uncaptured area.

An imaging plan presentation apparatus according to a fourteenth aspect of the present invention further includes an actual imaging condition acquisition unit that acquires an actual imaging condition including at least one of an imaging position of an actually captured image of the check point for the structure, an imaging direction, an imaging distance, a focal length, or a sensor size. The imaging plan generation unit identifies an uncaptured area on the basis of the actual imaging condition, and re-generates an imaging plan corresponding to the identified uncaptured area.

An imaging plan presentation method according to a fifteenth aspect of the present invention is performed by a computer, including the steps of acquiring an imaging condition necessary for detection of damage to a structure, generating an imaging plan for an entire check point for the structure on the basis of the imaging condition, presenting the imaging plan to a user, and re-generating an imaging plan corresponding to an uncaptured area of the check point for the structure on the basis of an actual imaging result of the check point for the structure.

An imaging plan presentation program for causing a computer to perform the imaging plan presentation method described above is also included in aspects of the present invention.

According to this invention, an imaging plan is updated in accordance with an uncaptured area, and an imaging range to be captured next is presented to a user. This allows the user to easily capture an uncaptured portion. The inspection-target photographic subject can be photographed for all the required ranges.

DESCRIPTION OF THE PREFERRED EMBODIMENTS

Figure 1:
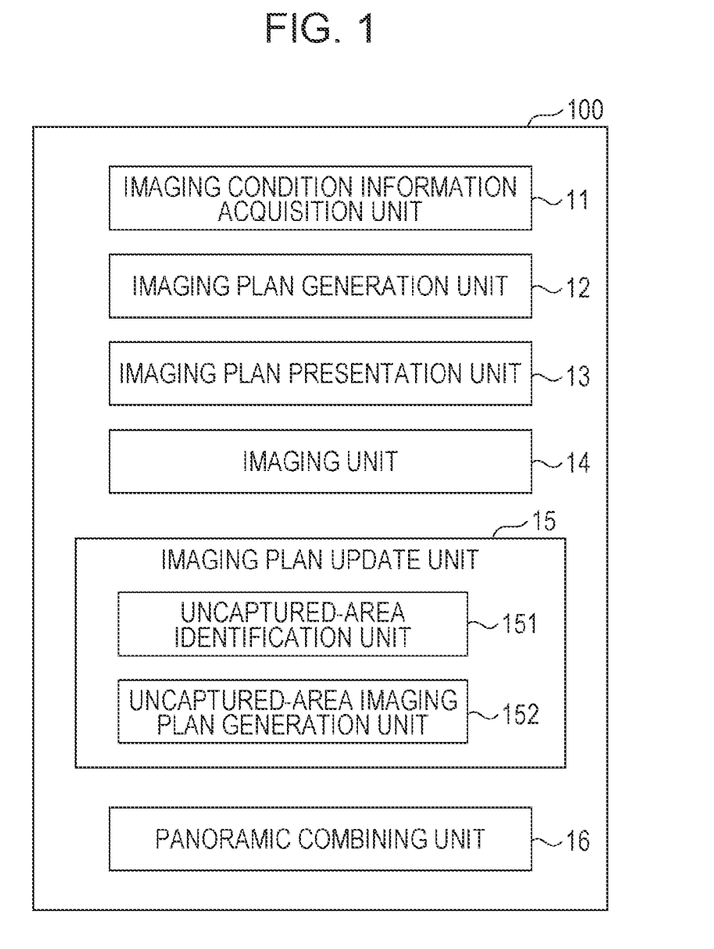
FIG. 1 is a block configuration diagram of an imaging plan presentation apparatus 100.

FIG. 1 is a block configuration diagram of an imaging plan presentation apparatus 100 according to a preferred embodiment of the present invention. The imaging plan presentation apparatus 100 includes an imaging condition information acquisition unit 11, an imaging plan generation unit 12, an imaging plan presentation unit 13, an imaging unit 14, an imaging plan update unit 15, and a panoramic combining unit 16. Each of these components can be constituted by one or more processors. A processor includes a CPU (Central Processing Unit), an ASIC (Application Specific Integrated Circuit), a GPU (Graphics Processing Unit), and so on. The imaging plan presentation apparatus 100 is constituted by a mobile information terminal such as a smartphone, a tablet terminal, or a digital camera, a personal computer, or the like. The imaging unit 14 and/or the panoramic combining unit 16 may or may not be integrated with the imaging plan presentation apparatus 100.

The imaging condition information acquisition unit 11 acquires imaging condition information from an internal sensor, an external terminal (a smartphone possessed by a user at an inspection site), or the like. The imaging condition information includes the conditions of the inspection site, namely, position information of the inspection site, the current time, the weather, the size of the inspection-target structure (photographic subject), and the imaging distance from the photographic subject to the camera, the imaging conditions of the camera, namely, the focal length, the number of pixels, the size of an image sensor of the digital camera, and the required resolution of the photographic subject, and so on. The size of the photographic subject is, for example, the size of a panel (the vertical and horizontal sizes of a panel) on a bridge, the height and width of a bridge pier, or the like. The imaging distance is the distance from the camera to the photographic subject, examples of which include the distance from the camera to the deck. The position information of the inspection site can be acquired by using GPS (Global Positioning System).

The imaging plan generation unit 12 generates, based on the imaging condition information, an imaging plan including a set of imaging ranges to cover the entirety of each check point for the inspection-target photographic subject. For example, the imaging plan generation unit 12 calculates the actual imaging size of each image satisfying a desired photographic-subject resolution and generates an imaging range covering each check point and having the calculated actual imaging size such that the overlap rate between different images is greater than or equal to a predetermined overlap rate.

Figure 2:
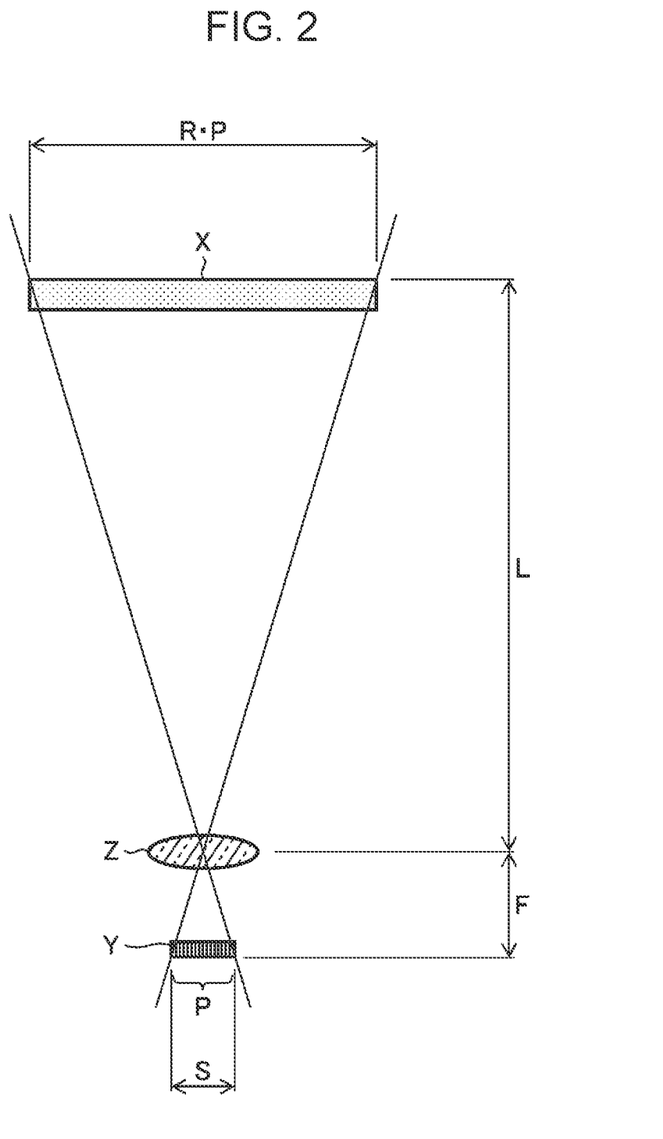
FIG. 2 is a diagram illustrating an example of imaging conditions.

As an example, as illustrated in FIG. 2, it is assumed that:

P: the number of horizontal pixels (or the number of vertical pixels) of an image sensor Y S: the horizontal size (mm) (or the vertical size) of the image sensor Y F: focal length (mm)

L: imaging distance (mm)

R: the photographic-subject resolution (mm/pixel) of a photographic subject X

P and S are determined by the specifications of the digital camera, and L is determined by the imaging site conditions. At this time, the focal length can be calculated by the equation below to satisfy the desired photographic-subject resolution R.

$$F=(L \times S)/(R \times P)$$

If the value of F falls outside the range of the focal length of a lens Z of the digital camera to be used, no imaging plan satisfying the imaging conditions can be generated.

As a specific example of values, if P=6000, S=23.6, L=5000, and R=0.3, then, F=65.56. Accordingly, for example, if the focal length of the lens Z ranges from 18 mm to 55 mm, no imaging plan satisfying the imaging conditions can be generated. On the other hand, for example, if the focal length of the lens Z ranges from 18 mm to 135 mm, an imaging plan satisfying the imaging conditions can be generated.

In another example, if the photographic-subject resolution=0.3 mm/pixel and the number of pixels=6000*4000 pixels, the actual imaging size of each image is 1800*1200 mm In an example, the predetermined overlap rate is assumed to be 30%. More specifically, an imaging plan is generated in which the predetermined overlap rate (such as 30%) is satisfied and the number of captured images is minimum. If no imaging plan satisfying the imaging conditions can be generated, a warning such as "the imaging distance is too long" or "the predetermined photographic-subject resolution is not satisfied with the focal length of the lens to be used" may be displayed on a display of the imaging plan presentation apparatus 100, for example, to notify the user of the warning to prompt the user to reset the imaging condition information. The overlap rate can be set as desired so long as the panoramic combining unit 16 can combine individual imaging ranges into a panoramic image.

The imaging plan includes at least an imaging range and the number of pixels. Since the user can adjust, as desired, the focal length, the imaging distance, and the imaging position to match the imaging range, the imaging plan may or may not include the focal length, the imaging distance, and the imaging position.

The imaging plan presentation unit 13 presents the imaging range to be captured in the current session to the user. Examples of the method of presenting the imaging range include displaying the imaging range on an internal display of the imaging plan presentation apparatus 100, displaying the imaging range on a display of an AR (Augmented Reality) device, and projecting the imaging range onto the photographic subject by using a projector. The imaging range may be displayed superimposed on a design drawing or the like of the inspection-target photographic subject.

The imaging unit 14 is a device constituted by a digital camera or the like and configured to generate and output image data (sub-image) obtained by capturing the imaging range of each check point for the photographic subject, that is, the structure. The imaging unit 14 may or may not be contained in the imaging plan presentation apparatus 100. For example, the imaging unit 14 may be a digital still camera separate from the imaging plan presentation apparatus 100. In this case, the imaging unit 14 wirelessly communicates with the imaging plan presentation apparatus 100 and transmits the image data obtained through imaging to the imaging plan presentation apparatus 100.

The imaging-target structure is not specifically limited, and examples thereof include a deck of a bridge, a road surface, a body concrete surface of a dam, a concrete surface in tunnel lining, and an outer wall of a building.

The imaging plan update unit 15 includes an uncaptured-area identification unit 151 and an uncaptured-area imaging plan generation unit 152. The uncaptured-area identification unit 151 identifies an uncaptured imaging range on the basis of the imaging plan generated by the imaging plan generation unit 12 and the image output from the imaging unit 14. The uncaptured-area imaging plan generation unit 152 updates the imaging plan on the basis of the uncaptured imaging range identified by the uncaptured-area identification unit 151 and re-generates an imaging plan corresponding to the uncaptured imaging range.

For example, the uncaptured-area identification unit 151 converts imaging ranges in a panoramic image obtained by combining sub-images captured in accordance with the imaging plan into the actual size from the actual scale of the photographic subject whose photographic-subject resolution or size in the image are known. On the other hand, the uncaptured-area identification unit 151 acquires the measurement value of the actual size of the entire inspection-target photographic subject or actual size information obtained from the drawing, as the actual size of the inspection-target photographic subject. The uncaptured-area identification unit 151 compares the actual size of the panoramic image with the actual size of the inspection-target photographic subject and identifies a non-matching portion therebetween as an uncaptured area.

Alternatively, the uncaptured-area identification unit 151 checks a panoramic image obtained by combining sub-images captured in accordance with the imaging plan against the full view of the photographic subject by using block matching or the like and identifies an area corresponding to the difference therebetween as an uncaptured area.

Alternatively, the uncaptured-area identification unit 151 acquires imaging condition information (such as imaging position information, the imaging direction, the imaging distance, the focal length, and the size of the image sensor) of an image captured in accordance with the imaging plan. These are imaging condition information corresponding to a captured imaging range. Then, the uncaptured-area identification unit 151 compares the imaging condition information corresponding to the captured imaging range with the imaging condition information of the imaging plan and identifies an uncaptured area from a non-matching portion therebetween.

The imaging plan that is re-generated by the imaging plan update unit 15 is presented to the user again by the imaging plan presentation unit 13. The user can continuously capture a required imaging range in accordance with the imaging plan.

Figure 3:
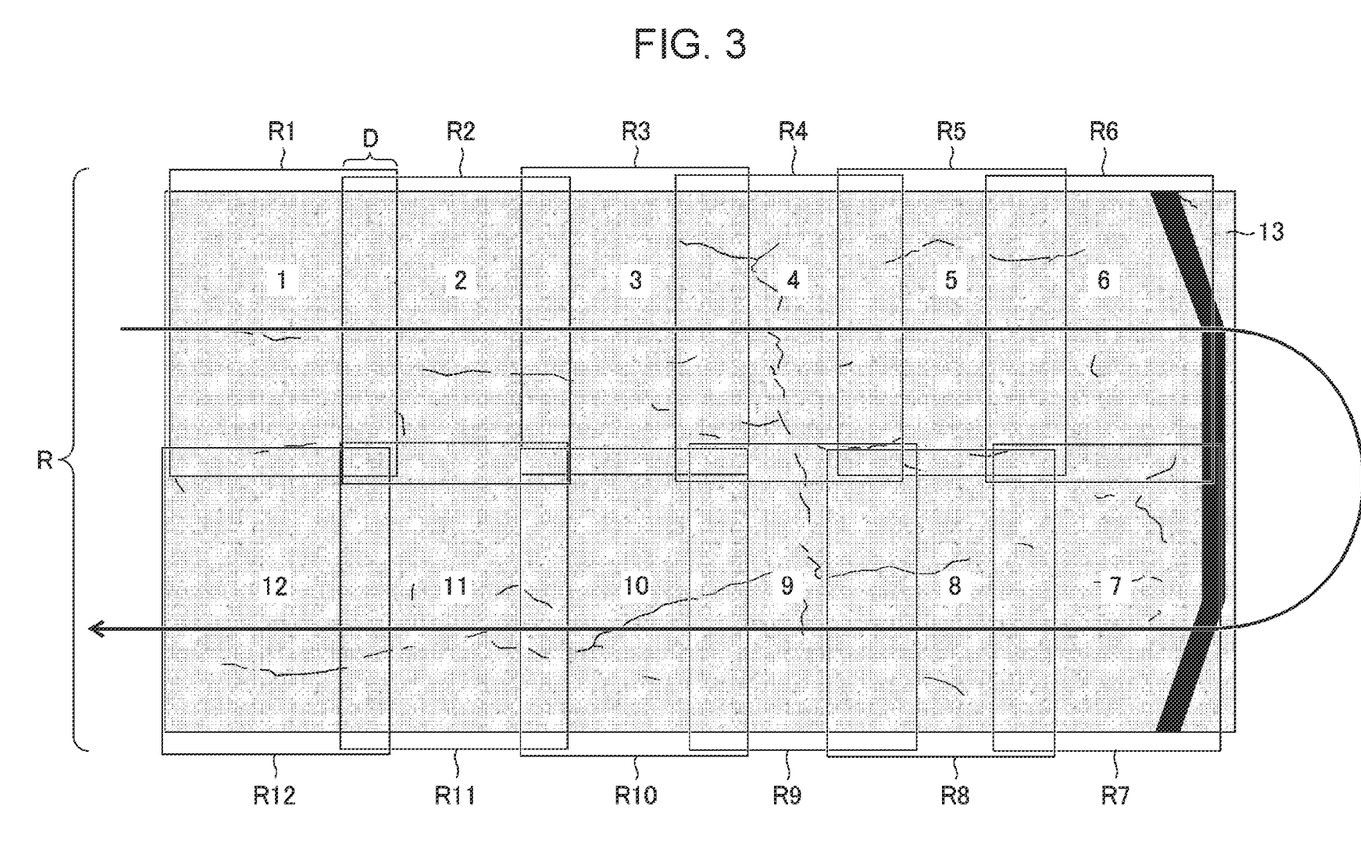
FIG. 3 is a diagram illustrating an example of an imaging plan.

FIG. 3 illustrates an example of an imaging plan. In this figure, the inspection point of the inspection-target photographic subject is a surface R of a deck of a bridge. The imaging plan includes imaging ranges R1 to R12 having a predetermined overlap rate D. R1 to R12 denote ranges to be captured in order from first to twelfth, respectively, to capture the full view (all the check points) of the inspection-target photographic subject in the shortest imaging order (shortest distance). The full view of the photographic subject is captured as a single image in advance by using a full-view image acquisition unit constituted by the imaging unit 14 and so on. The imaging resolution for the full view of the photographic subject is arbitrary since fine cracks are not to be detected.

It is desirable to generate an imaging plan such that, for the imaging order, the moving distance for imaging is the shortest. In addition, the movement direction of the imaging position may be fixed or priority may be given to the movement order depending on the circumstances. In this case, it is desirable to generate an imaging plan in accordance with a rule for the movement direction, the movement order, or the like.

Figure 4:
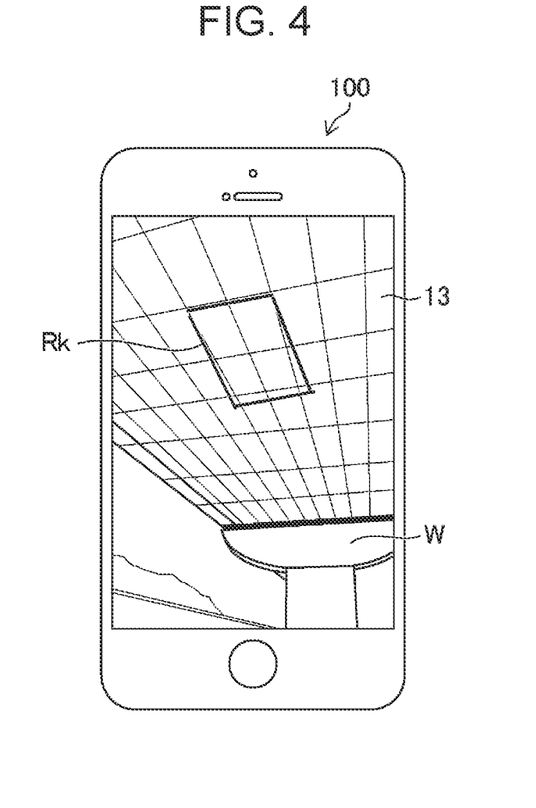
FIG. 4 is a diagram illustrating an example display of an imaging range.

FIG. 4 illustrates an example of the presentation of an imaging plan. As illustrated in FIG. 4, a live view image W of a photographic subject and an imaging range Rk are displayed in a superimposed manner on the imaging plan presentation unit 13 of the imaging plan presentation apparatus 100, which is constituted by a display of a camera-equipped mobile information terminal such as a tablet, a digital camera, or a smartphone. At this time, the imaging range to be displayed on the imaging plan presentation unit 13, which is constituted by a display, may be calculated on the basis of the position information of the camera-equipped mobile information terminal acquired by using GPS (Global Positioning System).

Alternatively, the imaging range may be displayed superimposed on a live view of a real photographic subject viewed by the user using an AR (Augmented Reality) device such as a head-mounted display.

Figure 5:
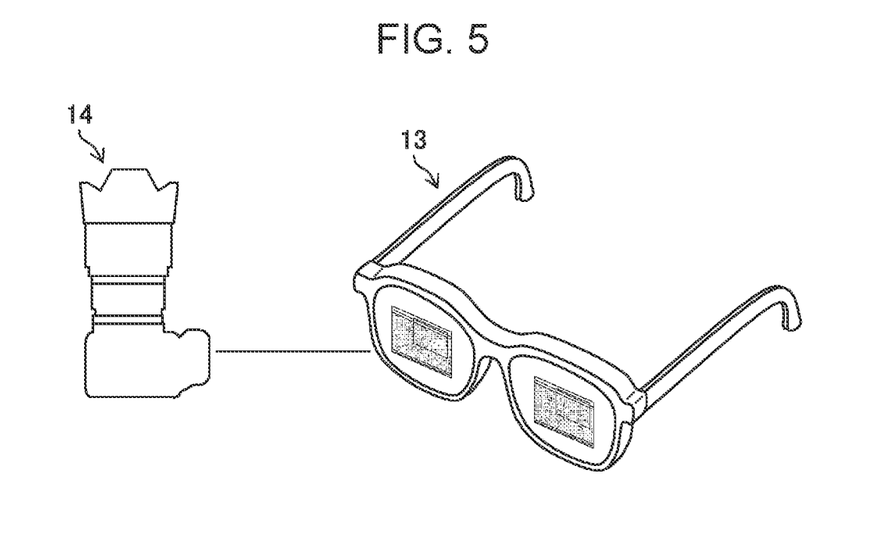
FIG. 5 is a diagram illustrating an imaging range displayed superimposed on an inspection target in a live view in real time.

As illustrated in FIG. 5, the imaging plan presentation apparatus 100 acquires a live view image captured by the imaging unit 14, which is constituted by a digital still camera, and performs object recognition using the image. The imaging plan presentation apparatus 100 recognizes the inspection target in real time, superimposes the imaging range on the recognized inspection target in the live view image in real time, and displays the live view image on the AR device. Even if an imaging condition such as the imaging position or the imaging angle changes in accordance with a movement of the imaging plan presentation apparatus 100, the imaging range is displayed accordingly.

Figure 6:
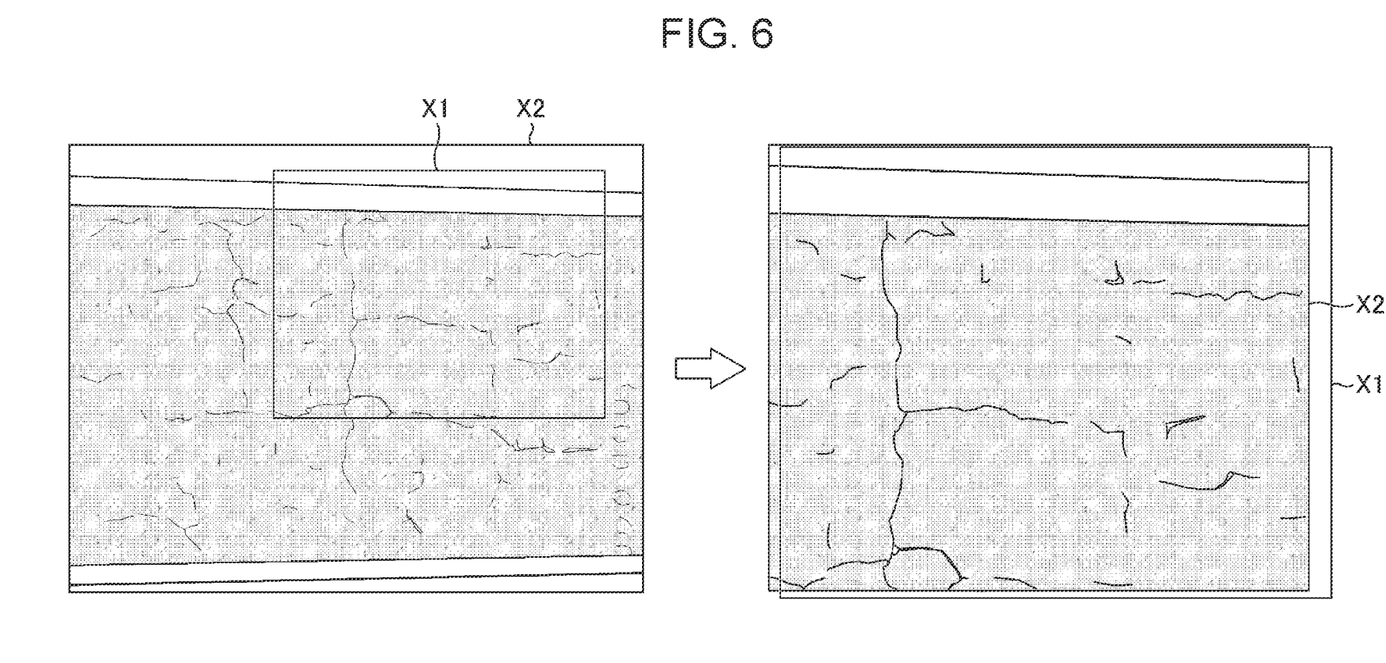
FIG. 6 is a diagram illustrating a change from a non-matching state to a matching state between an imaging range X1 and a live view X2 of the inspection target.

Further, as illustrated in FIG. 6, if an imaging range X1 and a live view X2 of the inspection target are changed from a non-matching state to a matching state as a result of the adjustment of the imaging distance or the focal length of the imaging unit 14, an imaging start instruction may be transmitted from the imaging plan presentation apparatus 100 to the imaging unit 14, and the imaging unit 14 may perform imaging in accordance with the instruction. This allows imaging to be automatically performed when an inspection target to be photographed in accordance with the imaging plan is captured in the imaging range, which is convenient.

Alternatively, when the imaging range X1 and the live view X2 of the inspection target become in a matching state, the user may be notified of this state through a message such as "imaging OK" that is displayed on a display of an AR device or the like or is reproduced audibly, or through the activation of the vibration function of the mobile phone to prompt the user to start imaging.

The phrase "the imaging range X1 and the live view X2 of the inspection target match", as used herein, includes a state where both match completely and a state where X1 and X2 overlap with the shift therebetween being within a predetermined threshold allowable range (for example, the area of the shift portion is within 5% of the area of the imaging range). When the imaging range X1 and the live view X2 of the inspection target are in the non-matching state, a message such as "imaging NG" may be displayed.

Alternatively, an image of the imaging range to be captured in the current session may be directly projected onto the inspection-target photographic subject by using a projector. In addition to the imaging range to be captured in the current session, the imaging ranges to be captured in the next and subsequent sessions may also be projected together with the imaging order.

Alternatively, a device (user guidance unit) capable of measuring the distance and the angle from a reference object, such as a GPS (Global Positioning System) terminal or a total station with a built-in range finder, may be used to guide the user by video or audio toward the imaging position, the imaging angle, and the imaging direction at which the imaging range can be captured. If the imaging direction, the imaging distance, the focal length, and the like of the imaging unit 14 do not vary, the user may be guided only to the imaging position. The camera may be guided to the imaging position by using a device such as a total station.

Figure 7:
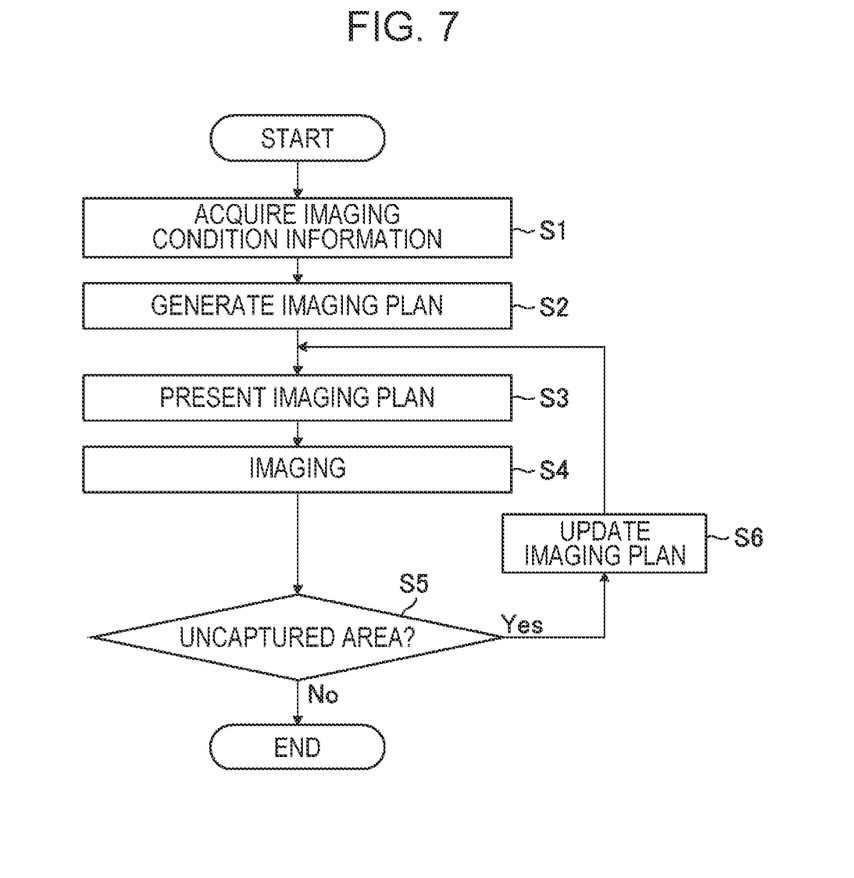
FIG. 7 is a flowchart of an imaging plan presentation process.

FIG. 7 is a flowchart of an imaging plan presentation process. A program for causing various computers (processors) to execute this process is recorded on various computer (processor) readable recording media such as an SDRAM, a ROM, and a CD-ROM.

In S1, the imaging condition information acquisition unit 11 acquires imaging condition information from an internal sensor, an external terminal, or the like. The imaging condition information includes the size of a structure, which includes the actual size of check points for the structure, the number of pixels of a captured image, the resolution, and the overlap rate between different images.

In S2, the imaging plan generation unit 12 generates, based on the imaging condition information, an imaging plan including imaging ranges for respective imaging sessions such that the entirety (all the check points) of the inspection-target photographic subject can be covered.

In S3, the imaging plan presentation unit 13 presents, based on the imaging plan, the imaging range to be captured to the user by using a display, audio, vibration, or the like.

In S4, the imaging unit 14 outputs image data (sub-image) obtained by photographing the photographic subject within the imaging range. The photographic subject is photographed by the imaging unit 14 when an instruction is input from the user or when the processor determines that a predetermined imaging condition is satisfied (for example, that the imaging range X1 and the live view X2 of the inspection target match).

In S5, the imaging plan update unit 15 determines whether an uncaptured area has been identified by the uncaptured-area identification unit 151 after the imaging unit 14 completes imaging. If Yes is obtained, S6 is performed. If No is obtained, the process ends.

In S6, the imaging plan update unit 15 updates the imaging plan on the basis of the uncaptured imaging range, and re-generates an imaging plan corresponding to the uncaptured imaging range. Then, the process returns to S3, and the imaging plan presentation unit 13 presents, based on the re-generated imaging plan, the imaging range to be captured next to the user. The panoramic combining unit 16 may combine sub-images captured in accordance with the imaging plan to create a panoramic image.

As described above, an imaging plan is updated in accordance with an uncaptured area, and an imaging range to be captured next is presented to a user. This allows the user to easily capture an uncaptured portion. The inspection-target photographic subject can be photographed for all the required ranges. In addition, since an imaging plan is generated with the shortest moving distance, the imaging time can be minimized Reference Signs List 11 imaging condition information acquisition unit
12 imaging plan generation unit
13 imaging plan presentation unit
14 imaging unit
15 imaging plan update unit
16 panoramic combining unit
100 imaging plan presentation apparatus
151 uncaptured-area identification unit
152 uncaptured-area imaging plan generation unit

What is claimed is:

1. An imaging plan presentation apparatus comprising at least one processor configured to:
   acquire an imaging condition necessary for detection of damage to a structure;
   generate an imaging plan for an entire check point for the structure on the basis of the imaging condition;
   present the imaging plan to a user;
   update the imaging plan on the basis of an actual imaging result of the check point for the structure;
   identify an uncaptured area of the check point for the structure on the basis of the actual imaging result of the check point;
   re-generate an imaging plan corresponding to the uncaptured area of the check point for the structure; and
   present the re-generated imaging plan to the user, wherein
   the at least one processor is further configured to:
      acquire an actual size of the check point for the structure;
      combine a plurality of captured images of the check point for the structure to create a panoramic image; and
      identify the uncaptured area on the basis of the actual size of the check point for the structure and the panoramic image, and re-generate an imaging plan corresponding to the identified uncaptured area.

2. The imaging plan presentation apparatus according to claim 1, wherein
   the at least one processor presents to the user, an imaging range to be captured next on the basis of the re-generated imaging plan.

3. The imaging plan presentation apparatus according to claim 1, wherein
   the at least one processor generates an imaging plan such that the number of times imaging is to be performed to cover the entire check point for the structure is minimum.

4. The imaging plan presentation apparatus according to claim 1, wherein the at least one processor generates an imaging plan such that a moving distance of an imaging device to perform imaging to cover the entire check point for the structure is shortest.

5. The imaging plan presentation apparatus according to claim 1, wherein
   the imaging condition includes a size of the structure, the number of pixels of a captured image, a resolution, and an overlap rate between different images.

6. The imaging plan presentation apparatus according to claim 5, wherein
   the imaging plan is an imaging range corresponding to sub-areas obtained by dividing a surface of the check point for the structure into a plurality of areas, and wherein the at least one processor calculates an actual imaging size of each captured image from the resolution and the number of pixels, and generates, as an imaging plan, an imaging range that covers the surface of the check point for the structure at the overlap rate or greater.

7. The imaging plan presentation apparatus according to claim 6, wherein
   the imaging plan includes an imaging order of the sub-areas, and wherein
   the at least one processor generates an imaging plan such that a moving distance of an imaging device to perform imaging in the imaging order is shortest.

8. The imaging plan presentation apparatus according to claim 6, wherein
   the at least one processor presents the imaging range in such a manner that the imaging range is superimposed on a drawing of the structure.

9. The imaging plan presentation apparatus according to claim 6, wherein
   the at least one processor presents the imaging range in such a manner that the imaging range is superimposed on a drawing of the structure displayed on a display.

10. The imaging plan presentation apparatus according to claim 6, wherein
    the at least one processor presents the imaging range in such a manner that the imaging range is superimposed on the check point for the structure by using a projector.

11. The imaging plan presentation apparatus according to claim 6, wherein
    the at least one processor presents the imaging range in such a manner that the imaging range is superimposed on a captured image of the check point for the structure by using an augmented reality device.

12. The imaging plan presentation apparatus according to claim 6, wherein
    the at least one processor is further configured to guide the user to an imaging position on the basis of position information of an imaging device or distance measurement information from the imaging device to the structure.

13. The imaging plan presentation apparatus according to claim 1, wherein
    the at least one processor is further configured to:
    acquire an actual imaging condition including at least one of an imaging position of an actually captured image of the check point for the structure, an imaging direction, an imaging distance, a focal length, or a sensor size; and
    identify an uncaptured area on the basis of the actual imaging condition, and re- generate an imaging plan corresponding to the identified uncaptured area.

14. An imaging plan presentation apparatus comprising at least one processor configured to:
    acquire an imaging condition necessary for detection of damage to a structure;
    generate an imaging plan for an entire check point for the structure on the basis of the imaging condition;
    present the imaging plan to a user;
    update the imaging plan on the basis of an actual imaging result of the check point for the structure;
    identify an uncaptured area of the check point for the structure on the basis of the actual imaging result of the check point;

re-generate an imaging plan corresponding to the uncaptured area of the check point for the structure; and present the re-generated imaging plan to the user, wherein the at least one processor is further configured to:

acquire a full-view image of the check point for the structure;

acquire a plurality of sub-images, each being a captured image of a portion of the check point for the structure; and check the plurality of sub-images against the full-view image to identify the uncaptured area, and re-generate an imaging plan corresponding to the identified uncaptured area.

15. An imaging plan presentation method performed by a computer, comprising:

acquiring an imaging condition necessary for detection of damage to a structure;

generating an imaging plan for an entire check point for the structure on the basis of the imaging condition;

presenting the imaging plan to a user;

updating the imaging plan on the basis of an actual imaging result of the check point for the structure;

identifying an uncaptured area of the check point for the structure on the basis of the actual imaging result of the check point;

re-generating an imaging plan corresponding to the uncaptured area of the check point for the structure; and presenting the re-generated imaging plan to the user, wherein the method further comprises:

acquiring an actual size of the check point for the structure;

combining a plurality of captured images of the check point for the structure to create a panoramic image; and identifying the uncaptured area on the basis of the actual size of the check point for the structure and the panoramic image, and re-generating an imaging plan corresponding to the identified uncaptured area.

16. The imaging plan presentation method according to claim 15, wherein the presenting the re-generated imaging plan to the user, includes presenting an imaging range to be captured next to the user on the basis of the re-generated imaging plan.

17. A non-transitory computer-readable recording medium for causing a computer to perform the imaging plan presentation method according to claim 15 when instructions stored in the recording medium are read by the computer.

18. An imaging plan presentation method performed by a computer, comprising:

acquiring an imaging condition necessary for detection of damage to a structure;

generating an imaging plan for an entire check point for the structure on the basis of the imaging condition;

presenting the imaging plan to a user;

updating the imaging plan on the basis of an actual imaging result of the check point for the structure;

identifying an uncaptured area of the check point for the structure on the basis of the actual imaging result of the check point;

re-generating an imaging plan corresponding to the uncaptured area of the check point for the structure; and presenting the re-generated imaging plan to the user, wherein the method further comprises:

acquiring a full-view image of the check point for the structure;

acquiring a plurality of sub-images, each being a captured image of a portion of the check point for the structure; and checking the plurality of sub-images against the full-view image to identify the uncaptured area, and re-generating an imaging plan corresponding to the identified uncaptured area.

\* \* \* \* \*